United States Patent [19]

Chatwani et al.

[11] Patent Number: 5,044,942
[45] Date of Patent: Sep. 3, 1991

[54] CEMENT SHAFT SUSPENSION FURNACE AND PROCESS

[75] Inventors: Ashok U. Chatwani, Burlington, Mass.; Rajiv Tiwary, Glenshaw, Pa.; Jaime A. Woodroffe, Andover; Oswald L. Zappa, Stoneham, both of Mass.

[73] Assignee: Gas Research Institute, Chicago, Ill.

[21] Appl. No.: 571,742

[22] Filed: Aug. 23, 1990

Related U.S. Application Data

[62] Division of Ser. No. 467,132, Jan. 18, 1990, Pat. No. 4,975,046.

[51] Int. Cl.⁵ .............................................. F27D 1/08
[52] U.S. Cl. ...................................... 432/99; 432/100; 432/101
[58] Field of Search ........................... 432/99, 100, 101

[56] References Cited

U.S. PATENT DOCUMENTS

| 3,887,326 | 6/1975 | Townley | 432/99 |
| 3,958,919 | 5/1976 | Kjell-Berger | 432/99 |
| 4,747,773 | 5/1988 | Predescu et al. | 432/99 |
| 4,764,107 | 8/1988 | Sundermann et al. | 432/99 |
| 4,797,092 | 1/1989 | Pieper | 432/99 |
| 4,850,861 | 7/1989 | Poroshin | 432/99 |
| 4,886,448 | 12/1989 | Schurmann | 432/99 |

Primary Examiner—Henry C. Yuen
Attorney, Agent, or Firm—Perman & Green

[57] ABSTRACT

Process and furnace for producing clinkered cement pellets from pellets of cement-forming batch materials without melting, fusion and agglomeration of said pellets. The furnace comprises an elongate vertical suspension shaft having top, intermediate and bottom portions. Pellets are fed at the top and heated to calcining temperatures before exiting the shaft into a pre-clinkering zone beyond the bottom. The pellets are heated to pre-clinkering temperatures and deposited on a porous pellet bed through which cooling air is forced to control the exothermic clinkering reaction and to regulate the speed at which the pellets migrate through the shaft.

6 Claims, 2 Drawing Sheets

CEMENT SHAFT SUSPENSION FURNACE AND PROCESS

This is a divisional of copending application Ser. No. 07/467,132 filed on 1-18-90 U.S. Pat. No. 4,975,046.

FIELD OF THE INVENTION

This invention relates to processes for the production of cement and more particularly to the use of novel suspension furnaces for preheating, calcining, and clinkering of cement particles to improve the efficiency and the quality of the product.

BACKGROUND OF THE INVENTION

Cement manufacture, a complex capital intensive process, is currently conducted in kilns, commonly using coal as fuel. The process starts with mixing the raw materials, usually limestone or chalk, as a source of calcium carbonate, and clay or shale, as a source of aluminum silicates, with small quantities of other minerals added in the desired portions. The batch materials are crushed to the order of 200 mesh and mixed in a fluidization chamber for one or two days. The conventional technique of pyroprocessing cement clinker is to heat the mixed batch materials in a suspension preheater or precalciner. In the process, calcium carbonate calcines to calcium oxide, and the exit temperature of the batch materials from the precalciner is approximately 900° C. The batch materials then go to the kiln in which they are slowly heated to the clinkering temperature of approximately 1400° C., at which temperature the clinker forms. The clinker, which is melted and agglomerated or fused into rocks of several centimeters in size during the exothermic clinkering reaction, is then cooled in a clinker cooler. The clinker may then mixed with gypsum, and is crushed to about 325 mesh to form a powdered cement composition.

In the past, cement plants were principally natural gas fired. However, over the last 30 years or so many producers have used coal as a fuel because of its lower cost and because the ash and sulfur dioxide from coal burning can enter the cement batch materials without causing any damage to the product quality. For this reason coal burning does not cause much pollution. The only problems caused by coal burning are maintenance problems and the formation of alkali sulfates which are unacceptable in the clinker. To maintain alkali sulfate concentration within acceptable limits, part of the hot gas is bypassed at a location where the alkali sulfates are in vapor phase.

Reference is made to U.S. Pat. No. 3,469,828 for its disclosure of the use of inclined rotary kiln furnaces for calcining and clinkering of cement, and for modifying conventional rotary kiln furnaces in order to overcome some of the problems resulting therefrom. However inclined rotary kiln furnaces have inherent disadvantages for cement manufacture. The heat introduced to the rotary kiln produces an uneven temperature in the rotating kiln since the heat produces a higher temperature at the upper wall surface as the particulates travel down the lower wall surface of the rotating kiln. This can result in burning of the particulates as the overheated wall surface rotates into contact with the particulates. Even if the temperature is closely controlled to prevent burning, a large percentage of cement particles melt during the clinkering stage of passage through the rotary kiln since clinkering is an exothermic reaction. The temperature in the kiln must be high enough to initiate clinkering, and cannot be sufficiently reduced in the rotary kiln to prevent melting, agglomeration, wall-adhesion and other related problems.

References is also made to U.S. Pat. No. 3,692,285 for its disclosure of a vertical calcining furnace for drying and hardening iron ore pellets which are fed therethrough from a packed bed supply hopper in a zig-zag direction over the surfaces of ceramic balls and through preheating, indurating and cooling zones. The particles flow as a packed mass supported by the ceramic balls, and cooling air is directed upwardly through the beds of ceramic balls to cool the iron ore pellets prior to discharge. Such an apparatus is not suitable for clinkering cement since the particles are supported and packed together during heating, which will clog the apparatus if the particles are melted or agglomerated. Also the particles are unevenly heated and unevenly cooled in such an apparatus, which is unsatisfactory in the case of good quality cement compositions.

According to another prior-known process, disclosed in U.S. Pat. No. 4,002,422, a vertical shaft furnace is used for the heat reduction of particulate iron oxide material which is fed into the top thereof from a packed bed. Hot processing gas is introduced at an intermediate location to heat the bed of particulate material in an upper heat treatment zone as the particles fall therethrough to reduce the iron oxide to metallic iron. Cold processing gas is introduced radially-downwardly at an intermediate buffer zone to become heated by the iron particles falling therethrough for heat recovery purposes, the heated "cold" processing gas flowing upwardly to heat the incoming iron oxide particles in the same manner as the hot processing gas. Finally the falling iron particles pass through a lower converging cooling zone and exit onto an exterior conveyor. Such an apparatus is unsatisfactory for the preparation of cement clinkers since cement particles will melt and fuse or agglomerate if they are present in a packed bed at the top of a vertical shaft furnace; the exothermic clinkering reaction will be completed and will cause melting and agglomeration of the cement particles in the packed bed and/or in the upper heating zone of the furnace, and cooling of the agglomerates in the buffer zone or lower cooling zone will not restore the particles to their original dimensions. Also the particles are permitted to flow freely, under the effects of gravity, so that there is no way to adjust the residence time of the particles within zones of the furnace which may have different temperatures.

SUMMARY OF THE INVENTION

The present invention relates to a novel process for producing cement and to a novel vertical suspension furnace for carrying out said process in which particulate cement-forming materials are introduced at a controlled rate at the top of the vertical furnace for controlled gravity migration through an upper drying zone, an elongate heating zone, a calcining zone and a lower clinker-initiation heating zone adjacent and spaced above the bottom of the furnace, said bottom comprising a porous bed which receives the heated calcined cement pellets for completion of the clinkering reaction thereon and through which cool combustion air is passed to counteract the exothermic heat of the clinkering reaction and prevent melting and agglomeration of the clinkered cement pellets. The relatively small clinker size is suitable for final grinding. The cement-forming process is completed in a matter of a few minutes. The cool combustion air, introduced through the clinker bed, is forced up through the vertical furnace at a velocity which regulates the downward gravity-migration rate of the particulates to a predetermined desired velocity, whereby the brief dwell time of the particles through the various heating zones can be regulated to assure complete calcination and initiation of clinkering by the time that the particulates deposit on the porous bed, downstream of the lowermost heating zone.

According to a preferred embodiment, the vertical suspension furnace comprises an interior cement shaft consisting of a plurality of hollow, vertical shaft modules, segments or conduits which taper downwardly and outwardly from a restricted upper particle inlet diameter, such as about 50 cm (20 inches), to an enlarged particle outlet diameter, such as about 1 meter (40 inches). Combustion gases are fed at longitudinally-spaced intervals directly into each of the individual conduits, for combustion therein, while a combustion-supporting gas such as air is forced upwardly through the particle outlets and through the conduits to support the gas combustion therewithin and to regulate the rate at which the particles fall through the conduits and thereby control the dwell time of the particles within the conduits. This enables heating of the particles to a predetermined maximum calcining temperature within each of the conduits, below the clinkering temperature. The apparatus or furnace includes lower gas burner means, beyond the particle outlets of the modules, to heat the calcined particles to their clinkering temperature, and a porous bed means immediately below the lower gas burner means for receiving the particles for completion of the exothermic clinkering reaction thereon. The combustion-supporting gases are introduced in cool condition upwardly through the porous bed, including the particles clinkering thereon, as a heat exchange medium which extracts the exothermic clinkering heat to prevent melting and/or fusion of the cement particles on the porous bed, and becomes heated thereby and by the lower gas burner means before entry into the particle outlets of the individual conduits. This recycles the clinkering heat up through the conduits to assist the heating of the incoming cement particles to their calcining temperature, the rate at which the combustion-supporting or oxidizing gases are forced upwardly through the gradually restricted conduit passages controlling the rate at which the cement particles are buoyed against free gravity fall downwardly through said conduits. Most preferably the incoming cement pellets have a diameter between about 0.5 and 5 mm and are fed directly into each of the particle inlets at a rate which is uniform for each of the conduits, to assure uniform particle migration rates and uniform temperatures within each of the conduits.

While shaft technology for making cement is very old, it has always been done with larger pellets, on the order of a few centimeters, in a packed bed. Such an arrangement results in difficulties in introducing the fuel uniformly, and therefore in poor product quality for which reason there are no operating packed-bed cement shaft furnaces in this country.

An essential feature of the present invention is the use of a "raining bed" of small pellets which are widely separated to introduce the fuel uniformly and to produce a product of acceptable quality. This feature differentiates the present invention from the old art of cement-making with shaft furnaces.

DETAILED DESCRIPTION OF THE INVENTION

Figure 1:
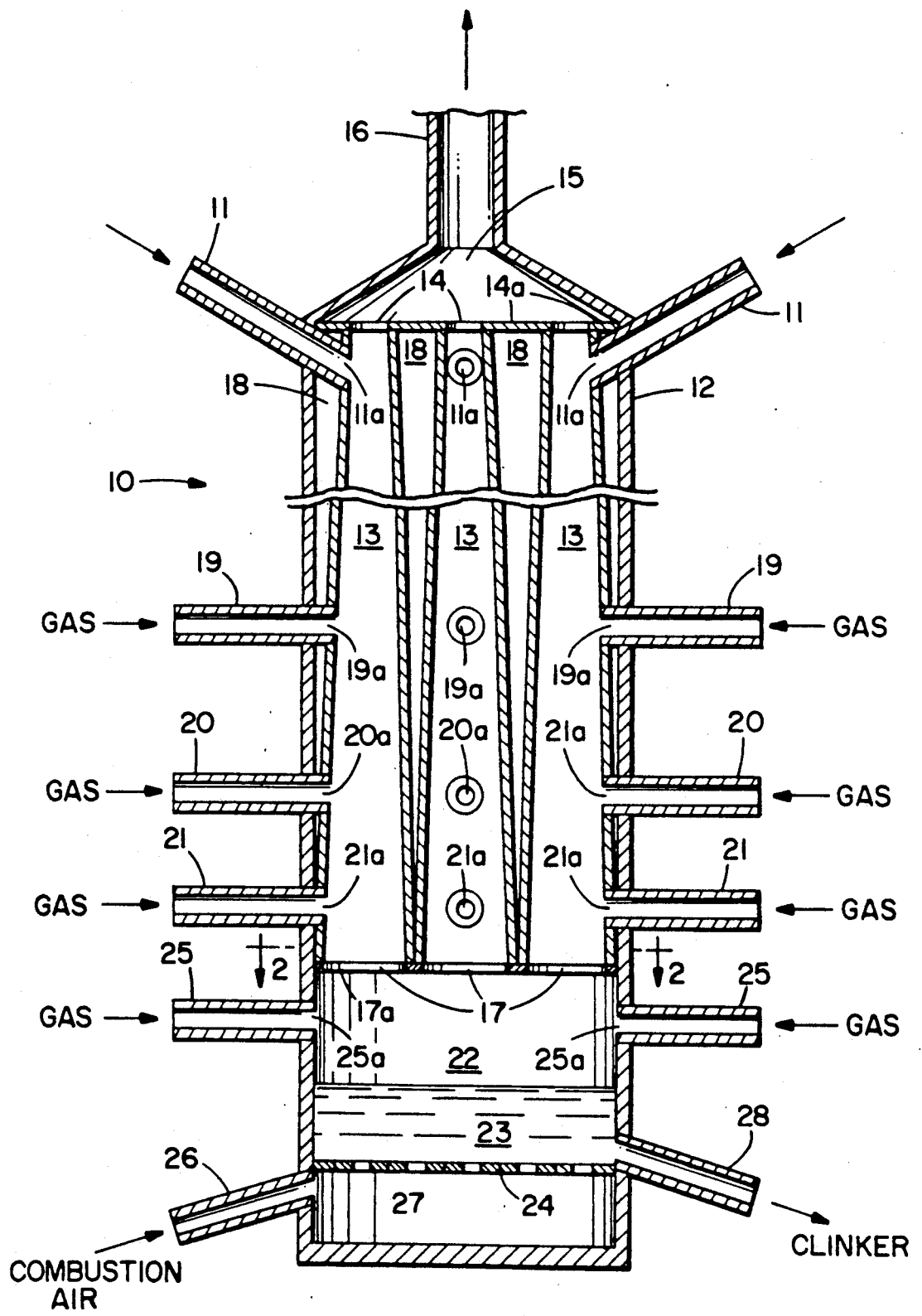
FIG. 1 is a sectional view of a cement shaft suspension furnace according to one embodiment of the present invention.

The present invention is directed to a vertical suspension furnace for synthesizing cement clinker from pelletized batch material wherein the pellets are sprayed into the vertical shaft at the top of the furnace, gas is fired at a number of immediate locations along the length of the furnace shaft, and combustion-supporting gas such as air is introduced from the bottom of the furnace. The falling pellets heat up to calcining and clinkering reaction temperature before landing on the top of a porous fixed bed. The clinker formation is completed on the fixed bed and clinker cooling is accomplished by forcing the cool combustion-supporting gases, such as air, up through the porous bed and clinkers to prevent melting and agglomeration by the exothermic heat of the clinkering reaction.

As the pellets fall in the furnace, they are heated in an upper calcining zone to the calcination temperature of 900° C. Gas is injected and burned at the upper calcining zone to provide the energy required for calcination. The rate of energy input and the shaft shape and rate of combustion-supporting gases are selected so as to limit the maximum temperature of the pellets to below the melting temperature, and to control the downward velocity of the pellets so as to provide sufficient residence time for the calcination of the pellets.

After completion of calcination in the calcination zone, the pellets are swollen and mechanically fragile. The falling calcined pellets are then heated further while falling through another, lower gas injection zone containing a low velocity upward air flow which causes all pellets to fall with uniform downward velocity and receive uniform heating. The pellets are heated to a clinker-initiation temperature of approximately 1400° C. before landing on the fixed bed at the bottom of the shaft; at this point enough liquid has formed within the pellet to strengthen it.

Combustion-supporting gas such as fresh air is introduced through the bottom of the fixed bed. The fixed bed serves two purposes, namely cooling the clinkers and providing residence time for the clinkering process to proceed to completion. The air flow rate up through the bed and the height of the bed are selected so that air leaving the bed is heated and equilibrated with the pellet temperature at the top of the bed and pellet cooling is confined to a very short section at the bottom of the fixed bed from which the clinkers are continuously withdrawn at a predetermined rate. This arrangement ensures that sufficiently long residence time is provided for clinker formation to proceed to completion, while cooling prevents melting and fusion or agglomeration, to produce a high quality particulate cement product.

A suspension furnace in accordance with the present invention has extremely high heat transfer rates between combustion gas and cement forming materials compared to prior art kiln systems, and this gives rise to a pyroprocessing unit which can be more compact than heretofore possible. The quality of cement clinker produced from the suspension process in accordance with the present invention is better than prior art processes because pellets are heated more uniformly when suspended than when resting on a kiln surface. Further, the use of natural gas instead of coal results in lower maintenance problems than heretofore, and eliminates the alkali sulfate cycle necessary in prior art coal heating systems. The simple process of the present invention, compared with the large and complex prior art furnaces and processes, enables a more trouble free production system. Also, the duration of the present process is a matter of minutes compared to the several hours required for prior known processes. This shorter processing period also results in better quality control because of the ability to change the pellet batch composition quickly.

The present proposed suspension shaft process introduces gaseous fuel in a free fall zone and avoids instabilities associated with coupled heat release and clinkering reactions. The burner design, shaft shape and pellet size and flow of air and pellets are properly selected to operate in a stable regime to ensure product uniformity and to achieve high heating rates in the suspension shaft region.

According to a preferred embodiment, the requirements of high heating rates, compact unit and uniform product quality are achieved through the use of a plurality of vertical modules, conduits or shaft segments which fill the wide furnace shaft to provide a plurality of narrow vertical suspension conduits. The high heating rates dictate that initial pellet size should remain in a narrow range around 2 mm. Special processing conditions should be met to avoid fragmentation of pellets in the calcination phase and agglomeration of pellets in the clinkering phase. In the present apparatus, pellet-pellet interactions and pellet wall interactions are minimized by maintaining large inter pellet distances during heating. The uniform dispersion of pellets in the suspension shaft is achieved by gas phase turbulence. All shaft modules or conduits are designed to provide a large ratio of length to diameter. The furnace shaft is compartmentalized by use of vertical walls as opposed to horizontal compartments which have a small length to diameter ratio. The injection of natural gas is achieved through specially designed low velocity burners located in the interior of each shaft conduit, which results in reduction of the overall shaft diameter and more uniform heating. It is also necessary to select upcoming air velocity in an appropriate range to provide sufficient residence time for the pellets in the various stages or zones and to maintain stable flow. At excessive air velocities, pellets are carried vertically upward where they may be overheated due to excessive dwell time in the calcining zone while, with low air velocities the pellets can fall too freely causing non-uniform pellet calcining and/or clinkering and non-uniform product quality.

When using coal, increased capital and operating costs are incurred for additional grinding and for emission control both for particulates and sulfur emissions. The finer grind is required to preclude fuel impact upon the pellets which could result in an unacceptable product. Since the ash in the fuel is vaporized during combustion, its condensation is in the submicron size requiring a more extensive bag house in lieu of an electrostatic precipitator which may be used when natural gas fuels the process. There is no sulfur attachment mechanism associated with the present suspension process since any sulfates formed are on the pellet surface and are subsequently evaporated as the pellet descends through the combustion zone, thereby forming a recycling zone with most of the sulfur escaping with the combustion gases. A scrubber would typically be required where either coal or oil fires the process.

Although problems with oils are much less in terms of ash content, emission control costs are comparable to coal since sulfur content is similar and submicron particles are generated. This additional cost combined with the high cost per BTU for oil burners does not make its use economically attractive.

Referring to the drawings, FIG. 1 illustrates a preferred suspension furnace 10 in accordance with the invention wherein conventional pellets formed with the necessary cement raw materials are uniformly distributed and introduced via individual pellet feed conduits 11 through the furnace wall 12 near the top of the cylindrical shaft furnace 10, directly and preferably at a downward angle into each one of the plurality of vertical shaft conduits 13, near to top portions thereof, preferably slightly downstream of the open upper ends or heat outlets 14 of each of the conduits 13. The heat outlets 14 open into a top chamber 15 having a heat-discharge pipe 16.

The plurality of vertical shaft conduits 13 number seven in the illustrated embodiment but may consist of fewer conduits of larger relative diameter or a greater number of conduits of smaller relative diameter, depending upon the width and height of the furnace 10 so as to substantially fill the vertical furnace shaft space within the furnace wall 12. Each of the shaft conduits 13 are hollow, temperature-resistant tubes, such as of ceramic composition, which gradually taper outwardly and downwardly from a more restricted, smaller-diameter, upper heat outlet 14 to a larger-diameter, lower combustion-supporting gas inlet 17. Preferably upper and lower plates or other barriers 14a and 17a are present to prevent the passage of particles or gases into the vertical void spaces 18 present around and between the shaft conduits 13.

As illustrated by FIG. 1, each of the shaft conduits 13 has four individual, spaced wall openings 11a, 19a, 20a and 21a, each of which communicates with an inlet pipe to receive materials directly and individually into the interior confines of each of the shaft conduits 13. Pellet feed inlet pipes 11 deliver a uniform and variable supply of pelletized cement raw materials through inlet openings 11a in a downward direction near the top of the shaft conduits 13 for gravity feed down each of the conduits 13 against the force of hot gases flowing upwardly through the conduits.

Upper combustion gas inlet pipes 19 deliver a uniform and variable supply of gas, such as natural gas, through upper gas inlet openings 19a directly into an upper heating and pre-calcining zone of each of the shaft conduits 13, each opening 19a comprising a gas burner nozzle or jet at which the flammable gas burns to discharge a flame into each of the preheating zones to generate a temperature which heats the pellets to a temperature up to about 900° C. as they enter the top of the shaft conduits 13 and fall down through the heating zone.

Spaced downwardly from the gas inlet pipes 19 are lower gas inlet pipes 20 and 21 which deliver a uniform and variable supply of the combustible gas, through spaced lower gas inlet openings 20a and 21a, respectively, directly into lower calcining and pre-clinkering zone of each of the shaft conduits 13, each opening 20a and 21a comprising a gas burner nozzle or jet at which the flammable gas burns to discharge a flame into the calcining zones of each of the shaft conduits 13 to heat the pellets to a temperature up to about 1400° C.

As the heated pellets pass into and through the calcining zone they become calcined and superheated to a temperature just below their clinkering temperature of about 1400° C. as they exit the wide shaft conduit outlets into a lower clinkering zone including a porous receiving bed 23 having a clinker discharge chute 28 adjacent the porous base 24 thereof. Beneath the porous base 24 is a combustion-supporting cool gas introduction zone 27 into which a uniform and variable supply of cool or cold gas, such as air, is supplied under pressure through an inlet pipe 26.

Clinkering of the cement particles is a chemical reaction which requires that the particles be heated to a clinker-initiation temperature of about 1400° C., after which the reaction becomes exothermic and requires no further heat input. In a relatively short time the exothermic heat normally will melt and liquify or fuse and agglomerate the pellets. However the novel furnace and process of the present invention avoids melting or fusion of the pellets by controlling the dwell time during which the pellets are subjected to clinker-initiation temperatures, and then cooling the clinkering pellets to prevent runaway exothermic temperatures which otherwise can result in melting and/or fusion.

This is accomplished in the furnace of FIG. 1 by causing the pre-clinkered pellets to exit the shaft conduits 13 into a clinker-initiation zone 22 at the base of the furnace and to deposit as a porous bed 23 of clinkering pellets on a porous base 24. The clinker-initiation zone 22 is heated to a clinkering temperature sufficient to heat the pellets to their clinkering temperature of about 1400° C. during their short dwell time in passing therethrough before deposit in the porous clinker bed 23 in which clinkering occurs through completion. The temperature in the clinkering zone 22 is produced by flammable gases introduced through lower gas pipes 25 and burned at lower gas nozzles or jets 25a. FIG. 1 illustrates two such radial gas pipes 25a but a plurality of such lower gas pipes preferably are spaced radially around the clinker-initiation zone 22 to produce a uniform high temperature therein.

Control of the clinkering reaction is accomplished by forcing a cool or cold combustion-supporting gas, such as air, at a predetermined, variable rate through the inlet pipe 26, into the lower introduction zone 27, up through the porous clinker-supporting base 24 and through the clinkering pellet bed 23 to cool the bed of pellets upwardly from the base 24 to the top surface of the bed which is receiving a continuous supply of clinkering pellets. Such cooling is controlled, by regulating the rate and/or the temperature of the cooling gas being introduced, so that uniform and complete clinkering takes place in the clinker bed 23, without any melting or fusion or agglomeration of the clinkered cement pellets. As fully-clinkered, cooled pellets are withdrawn from the bottom of the bed 23, adjacent the base 24, through discharge chute 28, new clinkering pellets are deposited on the top of the clinkering bed 23, are gradually moved down towards the porous base as the clinkering reaction proceeds under the influence of the upward cooling air which prevents melting and fusion or agglomeration, and finally approach the base 24 and discharge chute 28 in clinkered and cooled condition.

The cooling gas, normally air, passes upwardly through the clinkering bed 23, in which it becomes heated, into the clinker-initiation zone 22, in which it is heated further, and up through each of the lower shaft conduit openings 17 in the form of a pre-heated combustion-supporting gas to support the combustion of the gases introduced through the lower inlet openings 21a and 20a and the upper inlets 19a in each of the vertical shaft conduits 13. Finally the combustion gas products are forced up through the discharge pipe or chimney 16.

As will be apparent to those skilled in the art, the temperatures within the heating, calcining and clinker-initiation zones of the present vertical shaft furnaces can be closely regulated by adjusting the volume and/or type of combustible gas introduced through the gas pipes 19, 20, 21 and 25. More importantly, the temperature of the pellets within these zones can be controlled by regulating the volume of cooling air forced up through these zones in association with the size or weight of the pellets and their rate of introduction, thereby regulating the rate of fall of the pellets and their dwell time under the influence of the temperatures present within the various zones. This result is further modified by the upwardly-converging shapes of the vertical shaft conduits 13 each of which opens into a large top chamber 15 to produce a venturi effect, whereby the flow of discharge gases is slowed or reduced in the tap areas into which the pellets are introduced through supply conduits 11, thereby preventing the pellets from being blown upwardly and out through the heat outlets 14. The downwardly gradually-diverging diameters of the shaft conduits 13 permits the combustion gases to rise at a gradually-faster rate to counteract the otherwise free gravity fall of the pellets, whereby the rate of fall of the pellets and their dwell time in the calcining and clinker-initiation zones can be increased by increasing the volume of cooling air which is introduced, to support or float the pellets against free fall, and vice versa.

Figure 2:
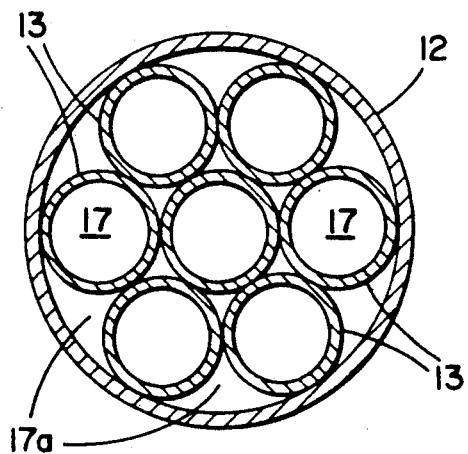
FIG. 2 is a sectional view taken along the line 2—2 of FIG. 1.

FIG. 2 of the drawings illustrates the cross-section of the shaft of the furnace of FIG. 1 at the outlets 17 of the shaft conduits 13. As shown, the wider bottom outlets 17 are round in cross-section and the spaces therebetween are blocked by a lower barrier 17a to prevent hot gases and/or combustion products from moving upwardly except through the conduits 13. Alternate shapes are possible, such as square, rectangular, hexagonal, etc.

The present furnace shaft may, for example, have a diameter of about 9 meters and a height of about 48 meters or more to produce for example, a nominal capacity of about 100 metric tons per hour of clinker or about 900,000 short tons per year of cement at about 90% capacity. The pellets preferably have a diameter between about 0.5 and 3.5 millimeters and are dispersed at about from 1 to $5 \times 10^4$ pellets per square meter of furnace cross section per second. A dispersion of $3 \times 10^4$ corresponds to a nominal capacity of about 100 metric tons of clinker per hour.

Figure 3:
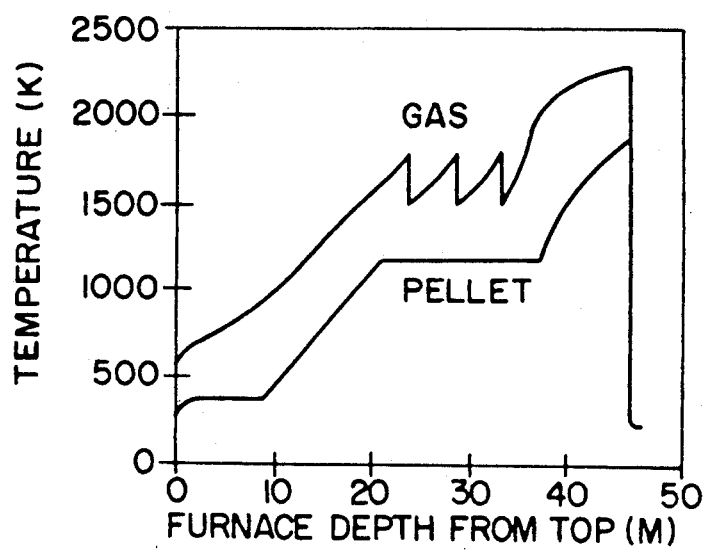
FIGS. 3 and 4 are graphs illustrating temperature and velocity, respectively, of pellets and gas along the height of the shaft for cement pellets which are 2 mm in diameter.
Figure 4:
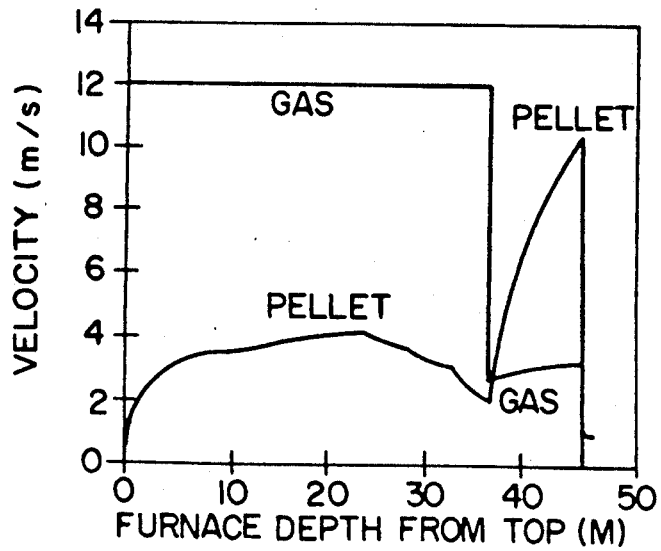

Typical temperatures of the pellets and gas at different locations in the furnace are shown in FIG. 3 and typical velocities of pellets and gas are shown in FIG. 4. The pellets are heated as they fall from the top of the furnace. They are dried in the heating zone and at about 1173° K. (900° C.) the calcium carbonate calcines in the calcining zone. In the clinker-initiation zone 21 the pellets are heated to about 1377° C. for initiation of the clinkering reaction. Finally the pellets fall onto the clinkering bed 22 where clinkering progresses and is completed while the pellets are being cooled.

As can be seen from inspection of FIG. 3, at a distance of about 20 meters from the top (in the calcining zone) the combustion temperature is between 1500 K (1227° C.) and 1850 K (1577°) whereas the pellets are at a calcining temperature of about a little over 1173° K. (900° C.). At a distance of about 35 meters from the top (in the clinker-initiation zone 22) the gas temperature increases to about 2250° K. (1977° C.) to heat the pellets to about 1650° K. (1377° C.) for a short time in order to initiate clinkering. Immediately thereafter the pellets are deposited and cooled on the clinkering bed 23 under the influence of the cooling gas, normally air, which prevents the exothermic heat from superheating the clinkers to their melting or fusion temperature. At the bottom of the pellet bed 23 the pellets have cooled to a temperature of about 450° K. (177° C.). FIG. 4 shows by way of example the velocity of the pellets and gas at various locations in the furnace.

In accordance with the invention the starting raw materials used to form the cement are pre-processed to form pellets. While some existing cement plants use pelletized feed with pellets having a diameter of 1 centimeter, such pellets are quite rigid, contain about 13 to 17% water by weight, and are not satisfactory for use in the process and apparatus of the present invention. Satisfactory pellets should have a diameter of from about 0.5 to 3.5 mm, preferably about 2 mm, and a water content of about 14% to 16%, preferably about 15% by weight, and should be formed of raw material ground to about 150 to 250 mesh, preferably about 200 mesh.

The height of the furnace may be varied to provide the desired pellet processing time. The pellets should also be formed to resist decrepitation due to the heating and cooling cycles to which type are exposed so that they do not degenerate into smaller particles. Further, since uniformity of pellet and gas flows in the horizontal plane is desired, non-uniformity of air and gas injection is to be avoided. Thus, injection burners should be used which maintain uniform heat release over any cross section.

The present invention has extremely fast heat transfer rates to the pellets and permits the use of a very compact furnace. The process permits initiation of the clinkering process in a period of about 5 seconds and completion of the clinkering process in a few minutes compared to the several hours required by prior art systems. The simplicity of the process results in low downtime, low maintenance and provides a higher quality of clinker.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A suspension furnace for producing discrete, clinkered cement pellets from discrete pellets of cement-forming batch materials in a minimum amount of time, comprising a vertical furnace housing enclosing a top heating portion, an intermediate calcining portion and a bottom clinkering portion, a vertical suspension shaft within said housing extending from said top heating portion and terminating above said bottom clinkering portion; heat-exhaust means in said top portion for exhausting heat from said vertical furnace housing; particle supply means in said top portion for introducing discrete cement-forming pellets to the top portion of said vertical suspension shaft for gravity-migration down to said bottom portion; upper heating means in the top portion of said shaft, downstream of said particle supply means, for heating cement-forming pellets supplied to said top portion to a pre-calcining temperature; intermediate calcination heating means in the intermediate calcining portion of said shaft for heating said cement-forming pellets migrating therethrough to their calcining temperature; lower clinker-initiating heating means in said bottom portion of said housing for heating said calcined cement-forming pellets exiting said shaft and migrating downstream therethrough to a temperature sufficient to initiate clinkering thereof, with resultant generation of exothermic heat; a porous base in the bottom portion of said housing, immediately downstream of said clinker-initiation heating means, for receiving a porous bed of said clinker-initiated cement pellets for the completion of the clinkering reaction thereon; cooling means in said bottom portion, downstream of said porous base means, for forcing a supply of a cooling combustion-supporting gas upstream through said porous base and through the porous bed of cement pellets clinkering thereon, to prevent the pellets from being melted and/or fused by the exothermic heat of the clinkering reaction, and upstream through said suspension shaft to regulate the dwell time of said pellets at said pre-calcining, calcining and pre-clinkering temperatures and for eventual release through said heat-exhaust means in said top portion; and discharge means, adjacent the upstream surface of said porous base means, for discharging discrete, cooled, clinkered cement pellets from the bottom of the porous bed of pellets, which have completely clinkered and cooled in said bed.

2. A suspension furnace according to claim 1 comprising suspension means for regulating the speed or gravity-migration of the cement-forming pellets downstream through said vertical shaft in order to control the dwell time of said pellets and the temperature to which they are heated in each of said top heating portions, intermediate clinkering portions and bottom clinker-initiating portions, said suspension means comprising means for regulating the upstream force of said combustion-supporting gas to slow the downstream gravity-migration of said pellets through said top, intermediate and bottom portions to provide dwell times therewithin to heat the pellets to predetermined desired heating, calcining and clinker-initiation temperatures, respectively.

3. A suspension furnace according to claim 2 in which said suspension mean further includes upwardly-converging walls on said vertical suspension shaft which cause the gradually-increased upstream force of said combustion supporting gas whereby the downstream gravity-migration of said pellets is slowed to the greatest extent in said top portion, to a lesser extent in said intermediate portion and to the least extent in said bottom portion.

4. A suspension furnace according to claim 3 in which said vertical suspension shaft comprises a plurality of upwardly-converging vertical cement shaft conduits, each of which includes a said pellet supply means, downstream heating means, further downstream calcining heating means, and a further downstream outlet immediately upstream said clinker-initiating heating means, for discharging calcined cement-forming pellets into said bottom clinker-initiating portion of the furnace housing.

5. A suspension furnace according to claim 2 in which each of said upper, intermediate and lower heating means comprises a gas burner and means for supplying independently-adjustable amounts of a combustible gas thereto for independently regulating the temperature in each of said top, intermediate and bottom portions of said vertical housing.

6. A suspension furnace according to claim 1 in which said pellets of cement-forming batch materials have a diameter between about 0.5 and 3.5 millimeters and a water content between about 14% and 15%.

* * * * *